US011811892B2

(12) United States Patent
McIntosh et al.

(10) Patent No.: US 11,811,892 B2
(45) Date of Patent: *Nov. 7, 2023

(54) SYSTEMS AND METHODS FOR NETWORK TELEMETRY DATA REPLICATION

(71) Applicant: NETFLIX, INC., Los Gatos, CA (US)

(72) Inventors: Colin McIntosh, Los Gatos, CA (US); Michael Costello, Los Gatos, CA (US)

(73) Assignee: Netflix, Inc., Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/934,111

(22) Filed: Sep. 21, 2022

(65) Prior Publication Data
US 2023/0016059 A1    Jan. 19, 2023

Related U.S. Application Data

(63) Continuation of application No. 17/313,835, filed on May 6, 2021, now Pat. No. 11,457,086.

(51) Int. Cl.
*H04L 67/563* (2022.01)
*H04L 67/1031* (2022.01)
*H04L 67/1095* (2022.01)

(52) U.S. Cl.
CPC ........ *H04L 67/563* (2022.05); *H04L 67/1031* (2013.01); *H04L 67/1095* (2013.01)

(58) Field of Classification Search
CPC .......................... H04L 67/563; H04L 67/1031; H04L 67/1095
See application file for complete search history.

(56) References Cited

U.S. PATENT DOCUMENTS

| 6,052,718 A | * | 4/2000 | Gifford | .................... H04L 61/30 709/219 |
| 10,666,724 B1 | * | 5/2020 | Agarwal | ............. H04L 67/1095 |

(Continued)

FOREIGN PATENT DOCUMENTS

WO      2020/106504 A1     5/2020

OTHER PUBLICATIONS

International Search Report and Written Opinion received for PCT Application Serial No. PCT/US2022/027936 dated Aug. 8, 2022, 14 pages.

(Continued)

*Primary Examiner* — Johnny B Aguiar
(74) *Attorney, Agent, or Firm* — Greenberg Traurig, LLP

(57) ABSTRACT

The disclosed computer-implemented method includes identifying a target networking device communicatively connected to a cluster of networked server instances. The networked server instances are configured to consume network telemetry messages. The method further includes applying a shared lock to the target networking device, so that only a single networked server instance has access to network telemetry messages produced by the target networking device. The method also includes replicating the network telemetry messages produced by the locked target networking device to other server instances in the cluster, and then diverting requests for network telemetry messages from the locked target networking device to another server instance in the cluster of networked server instances. This allows the other server instance in the cluster to service the diverted telemetry data requests for the locked target networking device using the replicated network telemetry messages. Various other methods, systems, and computer-readable media are also disclosed.

20 Claims, 7 Drawing Sheets

(56) References Cited

U.S. PATENT DOCUMENTS

| | | | | |
|---|---|---|---|---|
| 2006/0132330 A1* | 6/2006 | Youn | ................... | H04Q 9/00 |
| | | | | 340/870.07 |
| 2007/0022121 A1* | 1/2007 | Bahar | ................. | H04L 67/1008 |
| 2008/0250099 A1* | 10/2008 | Shen | .................... | H04L 67/101 |
| | | | | 709/203 |
| 2018/0227199 A1* | 8/2018 | Liu | ........................ | H04L 69/18 |
| 2019/0281373 A1* | 9/2019 | Sadasivarao | .......... | H04L 41/046 |
| 2021/0390082 A1* | 12/2021 | Gerphagnon | ....... | G06F 21/6218 |
| 2022/0038309 A1* | 2/2022 | Boutros | ................. | H04L 45/74 |
| 2022/0058034 A1* | 2/2022 | Grohoski | .............. | G06F 9/5016 |
| 2022/0311680 A1* | 9/2022 | Huang | ............... | H04L 41/0806 |

OTHER PUBLICATIONS

Shakir A Shaikh P Borman M Hines C Lebsack C Morrow Google R: "gRPC Network Management Interface (gNMI); draft-openconfig-rtgwg-gnmi-spec-00.txt", GRPC Network Management Interface (GNMI); draft-openconfig-rtgwg-gnmi-spec-00.txt, Internet Engineering Task Force, IETF; Standardworkingdraft, Internet Society (ISOC) 4, Rue Des Falaises CH-1205 Geneva, Switzerland, Mar. 13, 2017 (Mar. 13, 2017), pp. 1-37, XP015118777, [retrieved on Mar. 13, 2017].

* cited by examiner

SYSTEMS AND METHODS FOR NETWORK TELEMETRY DATA REPLICATION

CROSS REFERENCE TO RELATED APPLICATION

This application is a continuation of U.S. application Ser. No. 17/313,835, filed 6 May 2021, the disclosure of which is incorporated, in its entirety, by this reference.

BACKGROUND

Computer networks often implement many different networking devices to transfer data between computing nodes. These networking devices may include routers, hubs, gateways, firewalls, switches, or other types of wired or wireless computer networking devices. These devices may be configured to track their own performance and may store that data as "telemetry data." This telemetry data may indicate, for example, how much data a node has processed, how quickly it processed that data, what its current data throughput is, what its current operational health levels are at, and other similar information.

This telemetry data is generally made available to any node or entity that requests the data. For example, a computer system may wish to receive the telemetry data of a specific router or a specific firewall. In such cases, the computer system would request the telemetry data from those networking devices, and those devices would transmit the telemetry data to the subscribing nodes each time it was generated. However, in computer networks that involve many thousands of network devices and potentially many tens of thousands or millions of subscribers, the amount of telemetry data requests and the amount of telemetry data transmitted by these networking devices may become burdensome on the computer network and on the networking devices themselves.

SUMMARY

As will be described in greater detail below, the present disclosure describes methods and systems that allow substantially any server instance in a cluster to serve telemetry data for any target networking device in the cluster.

In one example, a computer-implemented method is provided that includes accessing a target networking device communicatively connected to a cluster of networked server instances. The networked server instances are configured to consume network telemetry messages. The method next includes identifying a shared lock to the target networking device, so that only a single networked server instance has access to network telemetry messages produced by the target networking device. The method further includes replicating the network telemetry messages produced by the locked target networking device to other server instances in the cluster of networked server instances. The method also includes diverting requests for network telemetry messages from the locked target networking device to other server instances in the cluster of networked server instances, thereby allowing the other server instances in the cluster to service the diverted telemetry data requests for the locked target networking device using the replicated network telemetry messages.

In some embodiments, the network telemetry messages are gRPC (Remote Procedure Call) Network Management Interface (gNMI) messages. In some cases, the gNMI messages are stored by the other server instance for a specified amount of time. In some examples, the gNMI messages are stored in a data cache. As such, the other server instances service the diverted telemetry data requests using the cached gNMI messages.

In some embodiments, the network telemetry messages are replicated to multiple server instances. In such cases, the requests for network telemetry messages from the locked target networking device are diverted to multiple server instances within the different server instances. In some cases, the network telemetry messages are replicated to an external server instance outside of the cluster of networked server instances. In such cases, requests for network telemetry messages from the locked target networking device are diverted to the external server instance outside of the cluster of networked server instances.

In some examples, the network telemetry messages produced by the locked target networking device are replicated to multiple other server instances that are configured to load-balance incoming requests for network telemetry messages among the various server instances.

In some embodiments, the above method further includes automatically loading the target networking device according to a metadata tag included in an associated target loader configuration file that is associated with the target networking device. In some examples, the method further includes providing a presentation component that is configured to export and present the network telemetry messages in a format that is understandable by the server instance. In some cases, the target networking device to which a shared lock has been applied includes a router, a gateway, a hub, or a firewall.

In addition, a corresponding system may include at least one physical processor and physical memory comprising computer-executable instructions that, when executed by the physical processor, cause the physical processor to: identify a target networking device communicatively connected to a cluster of networked server instances, where the networked server instances are configured to consume network telemetry messages, apply a shared lock to the target networking device, such that only a single networked server instance has access to network telemetry messages produced by the target networking device, replicate the network telemetry messages produced by the locked target networking device to other server instances in the cluster of networked server instances, and divert requests for network telemetry messages from the locked target networking device to another server instance in the cluster of networked server instances, allowing the other server instance in the cluster to service the diverted telemetry data requests for the locked target networking device using the replicated network telemetry messages.

In some cases, the computer system further instantiates a connection manager to maintain a list of cluster members in the cluster of networked server instances using a common interface. In some embodiments, one or more of the server instances add themselves to a listing of server instances in the cluster of networked server instances using a common address. In some cases, at least one of the server instances added to the listing of server instances requests a list of other members of the cluster of networked server instances and an indication of where the replicated network telemetry messages are stored on each cluster member. Then, upon learning where the replicated network telemetry messages are stored on other cluster members, the computer system indicates to various underlying server instance components where to fetch the replicated network telemetry data. As such, the underlying server instance components access the replicated network telemetry messages at the indicated location.

In some embodiments, the system further determines that a new target networking device has come online within the cluster of networked server instances, and automatically applies a shared lock to the new target networking device. In some examples, the system further reformats various portions of data included in the replicated network telemetry messages for compatibility with a specified network analysis tool. In some cases, the system further presents portions of data included in the replicated network telemetry messages in a data visualization tool.

In some examples, the above-described method may be encoded as computer-readable instructions on a computer-readable medium. For example, a computer-readable medium may include one or more computer-executable instructions that, when executed by at least one processor of a computing device, may cause the computing device to: identify a target networking device communicatively connected to a cluster of networked server instances, where the networked server instances are configured to consume network telemetry messages, apply a shared lock to the target networking device, such that only a single networked server instance has access to network telemetry messages produced by the target networking device, replicate the network telemetry messages produced by the locked target networking device to other server instances in the cluster of networked server instances, and divert requests for network telemetry messages from the locked target networking device to another server instance in the cluster of networked server instances, allowing the other server instance in the cluster to service the diverted telemetry data requests for the locked target networking device using the replicated network telemetry messages.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
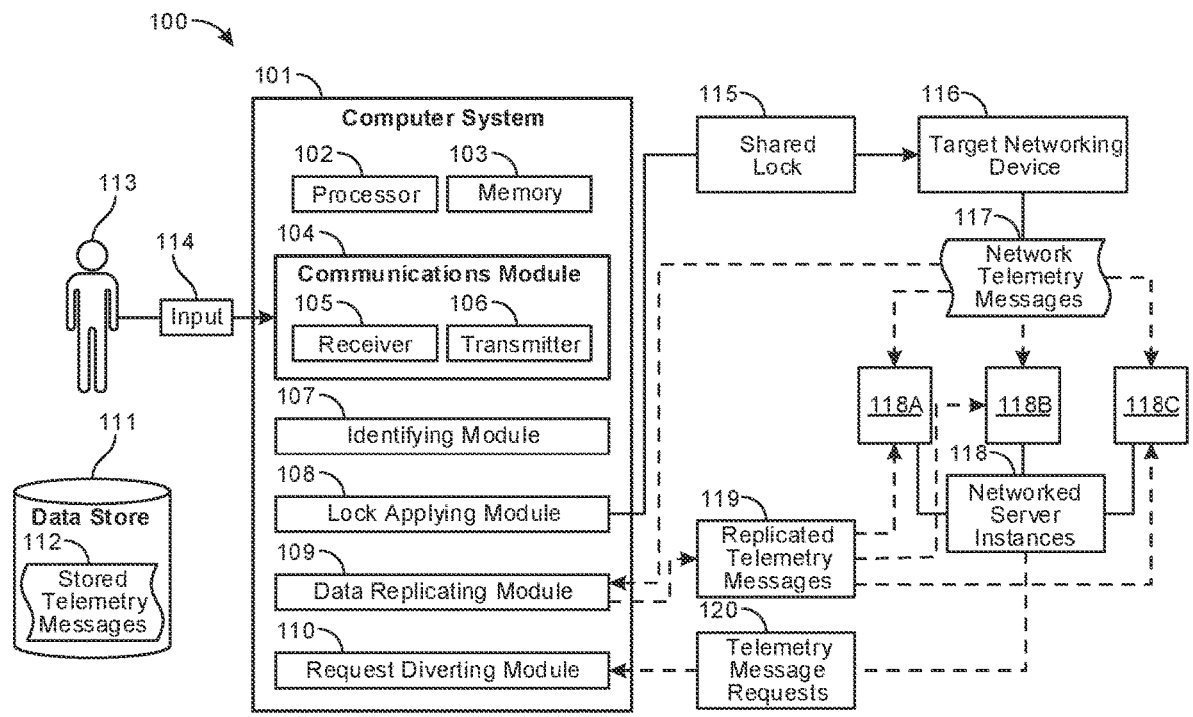
FIG. 1 illustrates a computing environment in which a server instance in a cluster may serve telemetry data for any target networking device in the cluster.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to methods and systems that allow substantially any server instance in a cluster to serve telemetry data for any target networking device in the cluster. As noted above, networking devices in computer networks are often designed to produce telemetry data. This telemetry data indicates how the networking devices are currently operating, or have operated in the past. The telemetry data may indicate that a device is working normally, processing data transfers as requested, or is working abnormally in some manner. In such cases, the telemetry data may be analyzed to solve any issues that may be manifesting on the networking device.

Within the networking device landscape, many different manufacturers produce and sell networking devices. Each of these different manufacturers typically handles the generation of telemetry data in a different manner and, as such, each device outputs telemetry data in a different format. For instance, some networking devices generate structured data laid out according to a specified format. Other networking devices generate unstructured data laid out according to a different format. As such, some traditional solutions have attempted to assemble and reformat the telemetry data into a structured format that is more easily understood by humans and other software tools. Regardless of how the telemetry data is formatted, however, each networking device is still subject to receiving inordinate amounts of requests from would-be subscribers.

Indeed, when producing the telemetry data, traditional computer networking devices may be bombarded by requests from other nodes within the network (or external to the network). For example, distributed or "cloud" computer systems are capable of spinning up new server instances by the hundreds or thousands if demand is sufficiently high. Any or all of these new (or older, existing) server instances may be configured to request telemetry data from (i.e., subscribe to) different networking devices. Thus, as will be appreciated, the transfer of telemetry data from each networking device to each of these server instances can quickly overwhelm a network, or at least add large amounts of unnecessary network traffic.

Still further, traditional computer networks do not provide a way to guarantee the availability of telemetry data. If, for instance, in the example above, a computer networking device becomes overwhelmed with normal data transfer requests or with telemetry data requests, that device may stop sending telemetry data or may send that data out at a much slower rate. Thus, traditional networking solutions do not guarantee the availability of any one device's telemetry data. Moreover, traditional solutions do not provide a way to distribute connections or data requests among other server instances, and similarly fail to provide a way to dynamically create these connections between server instances.

In contrast, the embodiments described herein are designed to ensure that requesting nodes will be able to access telemetry data for any target networking device they may select. For instance, if a requesting node wants telemetry data from a specific target device, that requesting node may request the telemetry data not from the target networking device itself, as occurred in the traditional systems described above, but from any of a variety of different server instances within the network. Indeed, the systems described herein are configured to allow any server instance in a cluster to serve telemetry data for any target networking device in the cluster. To make this happen, the systems herein apply a shared lock to the target networking device. The shared lock ensures that the target networking device only receives requests from (and only transfers data to) a single server instance. As such, the shared lock limits which server instance can request its telemetry data. This prevents the target network device from being overwhelmed with requests for telemetry data from the many different server instances in the network.

Once the shared lock has been applied to the target networking device and incoming requests have been limited to a single server instance, that server instance will access and store the target networking device's telemetry data, either locally or in a distributed data store. The replicated telemetry data stored by the server instance provides high availability of the telemetry data. Indeed, because the target device's telemetry data has been replicated and stored, that server instance may then serve the stored telemetry data to other requesting nodes in the network. Still further, other server instances in the network may also replicate the telemetry data, and may serve that telemetry data to other nodes or entities who desire to access the data.

With the telemetry data spread over multiple server instances or over distributed data stores, the systems herein may also provide load balancing features. For instance, if a group of telemetry data requests comes in at the same time or within a short timeframe, at least some of those requests may be forwarded to other server instances or to other data store nodes to balance the load among the available nodes in the network. Still further, when referring requesting nodes to different server instances or other data stores, the systems herein may provide automatic connections to those other server instances. The server instance that receives telemetry data according to the shared lock, for example, may be designed to automatically connect to other server instances or data storage nodes using tags that identify those server instances or nodes. The tags allow connections to be formed automatically between different server instances and between server instances and target networking devices or other nodes. Performing automatic connections in this manner reduces the amount of time needed to access and share the stored telemetry data. Each of these embodiments described above will be explained in greater detail below with regard to FIGS. 1-10.

FIG. 1 illustrates a computing environment 100 in which any server instance in a cluster of server instances may serve telemetry data for any target networking device in the cluster. FIG. 1 includes various electronic components and elements including a computer system 101 that may be used, alone or in combination with other computer systems, to perform tasks associated with license acquisition and provisioning. The computer system 101 may be substantially any type of computer system including a local computer system or a distributed (e.g., cloud) computer system. The computer system 101 includes at least one processor 102 and at least some system memory 103. The computer system 101 includes program modules for performing a variety of different functions. The program modules may be hardware-based, software-based, or may include a combination of hardware and software. Each program module uses computing hardware and/or software to perform specified functions, including those described herein below.

For example, the communications module 104 may be configured to communicate with other computer systems. The communications module 104 includes any wired or wireless communication means that can receive and/or transmit data to or from other computer systems or other entities (e.g., receiving input 114 from user 113). These communication means include hardware radios including, for example, a hardware-based receiver 105, a hardware-based transmitter 106, or a combined hardware-based transceiver capable of both receiving and transmitting data. The radios may be WIFI radios, cellular radios, Bluetooth radios, global positioning system (GPS) radios, or other types of radios. The communications module 104 is configured to interact with databases, mobile computing devices (such as mobile phones or tablets), embedded or other types of computing systems.

The computer system 101 further includes an identifying module 107. In some embodiments, the identifying module 107 is configured to identify a target networking device 116. The target networking device 116 may be substantially any type of networking device including a router, a switch, a gateway, a firewall, a wired or wireless radio, or any other computer networking device implemented to transmit and/or receive data on a computer network. The target networking device 116 is connected (either wirelessly or via a wired connection) to one or more networked server instances (e.g., 118A, 118B, or 118C). A "server instance," as the term is used herein, refers to a physical server that accesses and/or provides data to other (e.g., client) computer systems, or refers to a virtual server that accesses and/or provides data to other computer systems. A virtual server may be a virtual machine or virtual server instance that is spun up or shut down on demand by a physical server computer system. As such, in some cases, a single physical server (or farm of servers) has many hundreds or thousands of server instances running simultaneously. The networked server instances 118A-118C are communicatively connected to each other over one or more computer networks of which the target networking device 116 is a part.

In some embodiments, the networked server instances 118A-118C are designed to access and use telemetry information from the target networking device 116. Thus, in traditional systems, each server instance would subscribe to and receive network telemetry messages 117 from the target networking device 116. However, because such a system would overwhelm the target networking device 116 with requests for telemetry data (e.g., request 120), and because the target networking device 116 would expend a great deal of processing time and bandwidth generating and sending network telemetry messages 117 to many hundreds or thousands of networked server instances (or more), the embodiments described herein apply a shared lock 115 to the target networking device 116. The shared lock 115 generated by the lock applying module 108 ensures that only a single networked server instance (e.g., any one of 118A, 118B, or 118C) will have access to the network telemetry messages 117 generated by the target networking device 116. This substantially eliminates the possibility of overloading the target networking device 116 with requests for telemetry messages 117.

The data replicating module 109 of computer system 101 (which may be a networked server or server instance itself) then replicates the telemetry messages 117 received from the target networking device 116. While the telemetry messages 117 are being replicated on at least one of the networked server instances, that networked server instance (e.g., 118B) will then begin to fulfill incoming requests for telemetry data from the target networking device 116. Indeed, in at least some embodiments, the replication of telemetry messages occurs simultaneously with the forwarding of telemetry data to fulfill incoming requests. Accordingly, the request diverting module 110 will divert incoming requests for network telemetry messages 117 from the target networking device 116 to the networked server instance that replicated the telemetry data (e.g., 118B in the example above). In some cases, the replicated telemetry messages may be stored 112 in data store 111 that is accessible by the computer system 101 and/or the networked server instances 118A-118C. These embodiments will be described in greater detail below with regard to method 200 of FIG. 2 and the embodiments illustrated in FIGS. 3-10.

Figure 2:
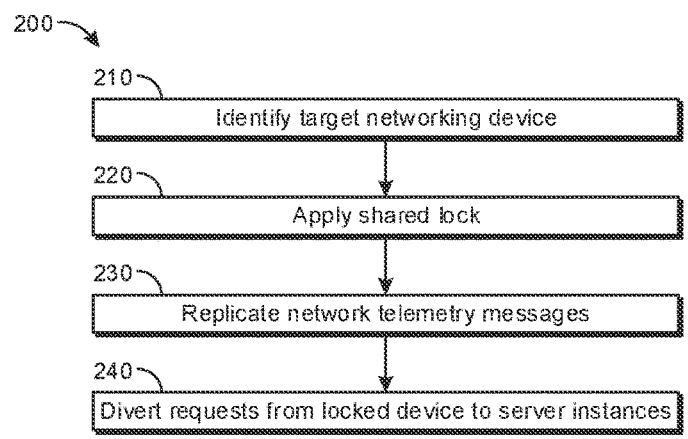
FIG. 2 is a flow diagram of an exemplary method for allowing any server instance in a cluster to serve telemetry data for any target networking device in the cluster.

FIG. 2 is a flow diagram of an exemplary computer-implemented method 200 for allowing any server instance in a cluster to serve telemetry data for any target networking device in the cluster. The steps shown in FIG. 2 may be performed by any suitable computer-executable code and/or computing system, including the system illustrated in FIG. 1. In one example, each of the steps shown in FIG. 2 may represent an algorithm whose structure includes and/or is represented by multiple sub-steps, examples of which will be provided in greater detail below.

As illustrated in FIG. 2, at step 210 of method 200, one or more of the systems described herein identify a target networking device communicatively connected to a cluster of networked server instances. Thus, in one example, the identifying module 107 of computer system 101 accesses target networking device 116, which is communicatively connected to a cluster of networked server instances 118. The networked server instances (e.g., 118A-118C) are configured to consume network telemetry messages 117 or other network telemetry data. The network telemetry messages 117 provide data regarding the current status of software running on the target networking device 116, hardware running on the target networking device 116, specific operations, logs, statistics, or other data or indicators of how the target networking device 116 is functioning.

At step 220 of method 200, the lock applying module 108 applies a shared lock 115 to the target networking device 116. The shared lock 115 ensures that only a single networked server instance (e.g., 118A) has access to network telemetry messages 117 produced by the target networking device 116. The shared lock 115 refers to any type of software-based or hardware-based lock that prevents direct access to the target networking device's network telemetry messages 117. The shared lock 115 may thus prevent incoming communications to the target networking device 116, or may prevent the networked server instances 118 from sending telemetry data requests, or may otherwise lock out other physical or virtual computer systems from accessing the network telemetry messages 117. In some cases, a gateway or other networking device applies the shared lock 115 for the target networking device 116. In other cases, a locking service, a database, or an external lock storage applies the shared lock 115 for the target networking device 116. Still further, although the shared lock 115 is illustrated as being applied directly to the target networking device 116, in at least some embodiments, the shared lock 115 is applied and/or stored separately from the target networking device 116 (e.g., using another computer system, another database, or a different external service).

Figure 3:
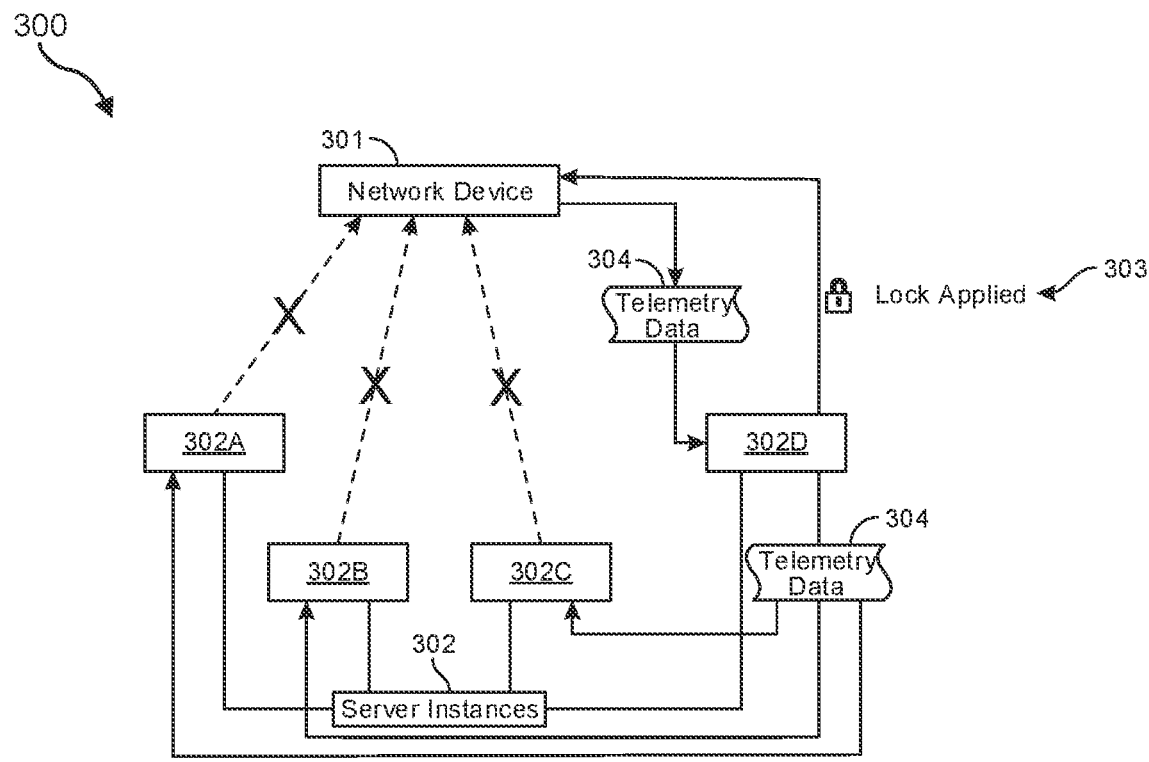
FIG. 3 illustrates a computing environment in which a shared lock prevents telemetry data requests from all but a single server instance.
Figure 4:
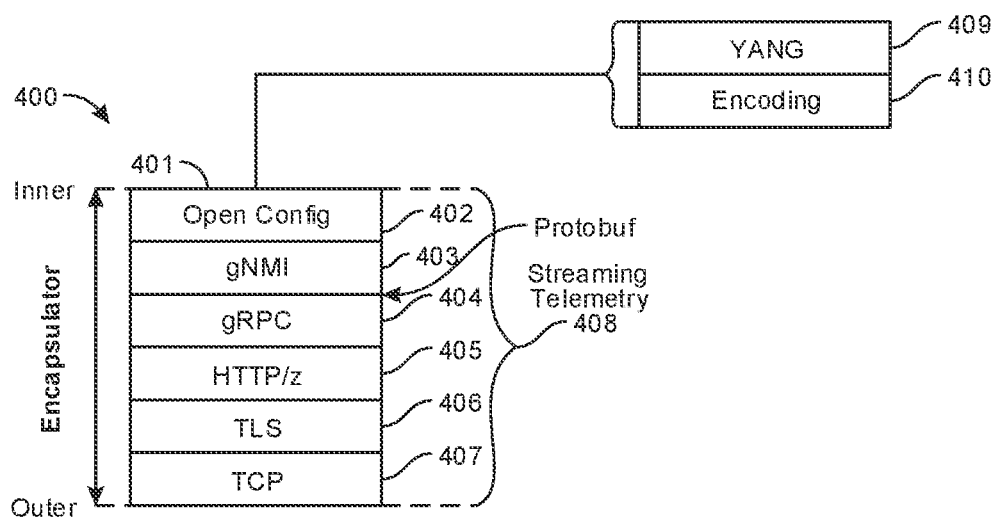
FIG. 4 illustrates an embodiment of a streaming telemetry data stack including a protocol buffer layer.

At step 230 of method 200, the data replicating module 109 replicates the network telemetry messages 117 produced by the locked target networking device 116 to one or more other server instances in the cluster of networked server instances 118. For instance, as shown in FIG. 3, a network device 301 is in communication with server instances 302, including specific server instances 302A-302D. As with the server instance 118A-118C in FIG. 1, there may be substantially any number of server instances 302A-302D that are in communication with the network device 301. A managing computer system (e.g., 101 of FIG. 1) or the network device itself applies a shared lock 303, such that server instances 302A, 302B, and 302C are no longer permitted to request and/or receive telemetry data 304 directly from the network device 301. The shared lock 303 permits server instance 302D to access the telemetry data 304 provided by the network device 301.

The server instance 302D then replicates the telemetry data 304 and provides that telemetry data 304 to the other server instances in the cluster (e.g., 302A-302C, and potentially others). The request diverting module (e.g., 110) of the managing computer system (e.g., 101), as part of step 240 in method 200, diverts requests for network telemetry messages from the locked target networking device 301 to a specific server instance (e.g., 302D) in the cluster of networked server instances 302. This allows that server instance in the cluster of server instances 302 to service the diverted telemetry data requests for telemetry data from the locked target networking device using the replicated network telemetry messages 119. Accordingly, in FIG. 3, the server instance 302D provides the replicated telemetry data 304 to the other server instances in the cluster (or at least to those server instances that have subscribed to receive the telemetry data from networking device 301).

In some embodiments, the network telemetry messages are gRPC (Remote Procedure Call) Network Management Interface (gNMI) messages. The gNMI messages are, at least in some cases, used to transmit telemetry data from a networking device to various server instances or other entities or computer systems that are subscribed to the networking device's telemetry data. As illustrated in embodiment 400 of FIG. 4, gNMI messages 403 may be part of a communication stack 401 that sits on the transmission control protocol (TCP 407), transport layer security (TLS 406), hypertext transport protocol (HTTP 405), and gRPC 404. Open Config 402 and other top layer applications are configured to access, analyze, transmit, and/or store the gNMI messages 403. In some cases, Open Config 402 implements Yang 409 (or another data modeling language) to define or create a data model, including modeling specific configurations, state data, and administrative actions. The data in the model is encoded 410 according to one or more specified encoding schemes. Other protocols may also be used as part of the streaming telemetry stack 408. In some embodiments, a protocol buffer or "protobuf" may also be part of the streaming telemetry stack, providing a language-neutral, platform-neutral, extensible mechanism for serializing structured data, similar to extensible markup language (XML).

In traditional implementations that use gNMI messages 403, the underlying systems typically lack any tolerance of failure. Most traditional software systems based on gNMI messages 403 are stateful and either require a mutable (e.g., changeable, updateable) deployment, or do not include any cluster awareness for failover or coordination between cluster nodes. In contrast, the embodiments described herein include clustering to better support failure tolerance. Server instance clustering allows multiple instances of an underlying service to coordinate and deduplicate connections to target network devices (e.g., 301 of FIG. 3). As part of this coordination and deduplication, the systems described herein establish a single connection to a target networking device to receive its telemetry messages (e.g., gNMI messages 403). By using this clustering functionality and replication among server instances, the systems described herein are able to avoid unnecessary duplicate gNMI connections to target networking devices.

To avoid these unnecessary gNMI connections to target networking devices, the embodiments described herein implement a shared lock per target networking device for coordinating these connections. For instance, as shown in embodiment 500 of FIG. 5, a shared lock 504 is applied to a single server instance 505. That server instance is then the only server instance in a given cluster that has access to the gNMI telemetry data 503 generated by the telemetry data generating module 502 of the target networking device 501. The locked server instance 505 then stores the gNMI data 507 in a cache 506 or other (local or distributed) data store. The server instance 505 may then duplicate the gNMI data 507 and pass that duplicated gNMI data 507 to other server instances in the cluster including server instances 508 and 509.

In some cases, server instances that have received the duplicated gNMI data 507 then pass that data on to other server instances, such as from server instance 509 to server instance 510. In other cases, server instances are configured not to forward gNMI data they receive from other cluster members in order to prevent duplicating the gNMI data. In such cases, the server instance 510 would receive the gNMI data 507 from server instance 505. In some instances, the shared lock 504 may be changed to another server instance, as long as there is cluster consensus among the server instances. In such cases, the shared lock 504 is transferred to another server instance in the cluster, and that server instance (e.g., 509) is now the sole server instance that has direct access to the target networking device's gNMI telemetry data 503. Furthermore, in some cases, when a new target networking device comes online within a cluster of server instances, a shared lock may be automatically applied to the new target networking device. This prevents the new target networking device from being overwhelmed with telemetry data requests from server instances in the cluster.

After a server instance acquires a shared lock 504 for a target networking device 501 and forms a connection to that device, the server instance (e.g., 505) thus, at least in some cases, begins to forward received gNMI telemetry data 503 into its local in-memory cache 506. The server instance 505 is now capable of providing the target networking device's telemetry data to any server instance in the cluster. Indeed, using this system, any server instance in the cluster of server instances may serve a subscription for any target networking device in the cluster, once the gNMI telemetry messages are replicated from the instance with the shared lock 504 to other server instances in the cluster. This replication of telemetry messages also allows any clustered server instance to accept client requests for any known target networking device within the cluster.

Then, with at least some instances (or every instance) in the cluster able to serve telemetry data streams for each target networking device, the systems described herein may load balance incoming connection requests among some or all of the cluster server instances. In at least some embodiments, the underlying transport for gNMI is HTTP/2 over TLS. In such cases, the system uses a layer three (or other) load balancer between the target networking device 501 and the server instances that consume the telemetry data. Other load balancers, including layer seven load balancers or domain name systems (DNS) load balancers may also be used.

In some embodiments, the underlying network infrastructure of a cluster of server instances is changed over time. For instance, new target networking devices are added to the network and older target networking devices are removed from the network. Similarly, server instances and other consumers of telemetry data are spun up and spun down over time. To allow network engineers or other users to make changes on the network without needing to update the configuration of the network many times per day, the embodiments described herein include a feature that loads one or more gNMI target networking devices from the underlying network management system (NMS) based on metadata associated with the network devices. In some cases, this metadata may be in the form of tags that are associated with network devices. Different types of metadata may also be used to dynamically load target devices. Using metadata such as tags, a network engineer or other user may request that a given networking device be loaded using the information specified in the associated tag. In other cases, the network engineer may not filter targets using metadata and, in such cases, would load all available target networking devices.

When the gNMI messages are stored by a server instance (e.g., on data store 111 of FIG. 1 or on data cache 506 of FIG. 5), those gNMI messages 503 may be stored for a specified amount of time. After that time has expired, the gNMI messages 503 are automatically purged from the cache. In other cases, the telemetry data is duplicated to another server instance and is then purged from the cache 506. In still other cases, the stored telemetry data (e.g., 507) is automatically purged from all cluster server instances after a specified amount of time has elapsed. Alternatively, the gNMI messages 503 may be stored indefinitely or until manually deleted by an administrator or other user. In cases where the gNMI messages 503 are stored in a data cache, that server instance is capable of servicing those telemetry data requests that are diverted from other server instances. In other words, telemetry data requests from server instances that do not have the shared lock 504 are diverted to the server instance (s) that do have the stored gNMI data 507. Those server instances then provide the requested gNMI telemetry data from their cache memory. Supplying the gNMI telemetry data from cache memory speeds up the data delivery process, and allows for quicker propagation across the various server instances and other nodes of the cluster.

Figure 5:
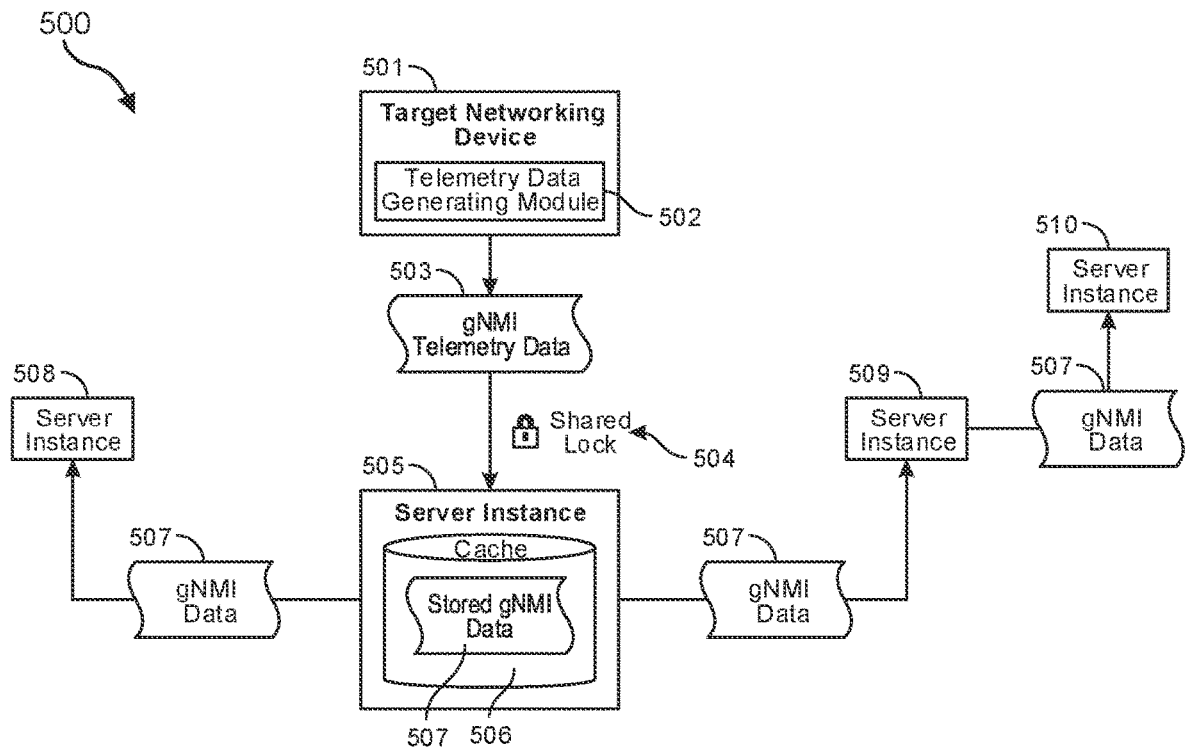
FIG. 5 illustrates an embodiment in which a server instance passes telemetry data to another server instance, which then provides that telemetry data to a still further server instance.

FIG. 5 further illustrates an embodiment in which network telemetry messages (e.g., gNMI data 507) are replicated to multiple different server instances (e.g., 505, 508, 509, and 510). Initially, the gNMI telemetry data 503 is sent only to server instance 505, as that server instance currently has the shared lock 504. Once the server instance 505 stores and duplicates the gNMI data 507, when other server instances (e.g., 508 and 509) request telemetry data for target networking device 501, those requests are diverted initially to server instance 505 (instead of going to target networking device 501. Then, once other server instances receive and/or store that telemetry data, those other server instances may fill service requests for the target networking device's telemetry data. Thus, for example, server instance 510 does not need to contact server instance 505 to get the stored gNMI data 507. Rather, because server instance 509 has already received the gNMI data 507 from server instance 505, server instance 510 may request the gNMI data from (or have its request diverted to) server instance 509 (or potentially server instances 505 or 508) within the cluster of server instances.

Figure 6:
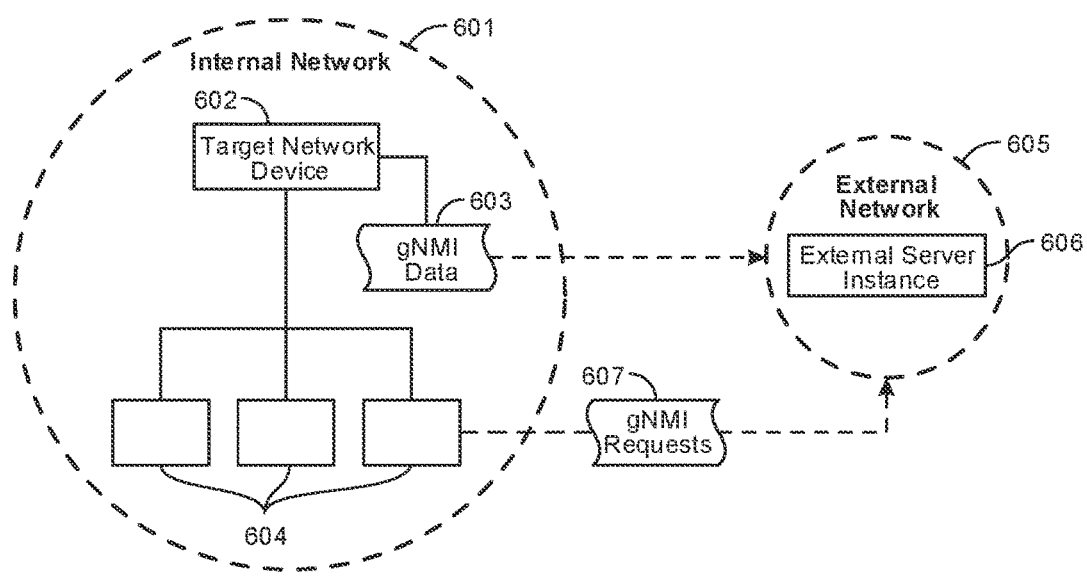
FIG. 6 illustrates an embodiment in which telemetry data is provided to an external network.

In some embodiments, network telemetry messages are replicated to external server instances outside of a given cluster. For instance, network telemetry messages may be replicated to external server instances outside of a given cluster when a client requests gNMI data 603. Thus, as shown in FIG. 6, an internal network 601 has a target network device 602 and a cluster of networked server instances 604. The target network device 602 outputs gNMI data 603 or other telemetry data. In some cases, the internal network 601 replicates the gNMI data 603 to an external server instance 606 in an external network 605, including cases where a client requests gNMI data 603. Once the gNMI data 603 has been replicated to the external server instance 606 of the external network 605, some or all of the gNMI requests 607 for telemetry data may be sent to the external server instance 606 that now has the replicated gNMI data 603. In some cases, the server instances 604 initially send the gNMI requests 607 to the (locked) target network device 602 or to other networked server instances are diverted to the external server instance 606 outside of the cluster of networked server instances 604. Thus, in this manner, flexibility and redundancy is increased by allowing some or all of the gNMI data 603 from a given locked target network device to be replicated to an external server instance 606 that is part of a separate, external network 605. Then, even if the internal network 601 goes down for some reason, the external server instance 606 will continue to fulfil the gNMI requests 607 sent out by the server instance 604.

In some cases, the internal network 601 may be a very large network with thousands or millions of server instances 604, as well as large numbers of target network devices (e.g., 602). In such cases, the server instances 604 are configured to replicate the network telemetry messages produced by a locked target networking device to multiple other server instances. These server instances 604 are configured to load-balance incoming requests for network telemetry messages among the other server instances, such that no server instance becomes overburdened with telemetry data requests. Accordingly, in such cases, gNMI requests 607 are sent or diverted to internal server instances 604 that have the replicated data and are load balanced among those internal server instances.

In some embodiments, the internal network 601 of FIG. 1 is part of an ever-changing system of hardware and software networking components and tools. Because the underlying network infrastructure is constantly changing in such networks, engineers often desire or need to make changes to the network. To allow network engineers to make these changes on the network without needing to update the configuration of the gNMI replication system multiple times per day, at least some of the embodiments herein include a feature that loads gNMI targets from a network management system (NMS) based on tags applied to network devices. Using this feature, the gNMI replication system automatically loads the target networking device (e.g., 602) according to a metadata tag included in an associated target loader configuration file that is associated with the target networking device. By using tags in this manner to load network devices, workers such as network engineers may make changes to the underlying network infrastructure without having to update the configuration of the gNMI replication system, as each target networking device is tagged and is loadable using that tag regardless of which changes are made to the network.

Figure 7:
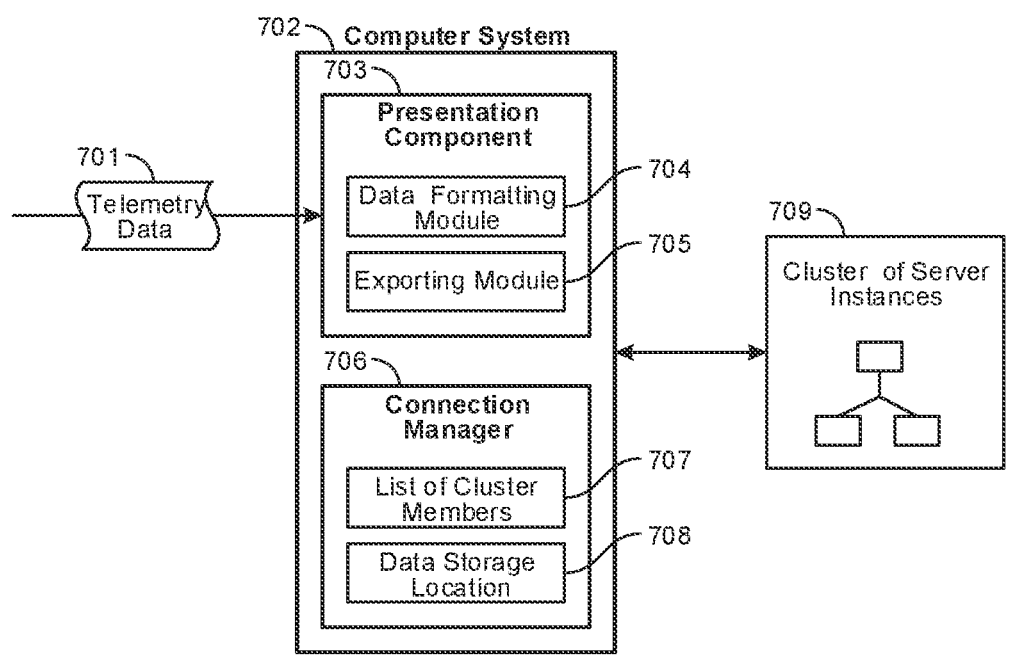
FIG. 7 illustrates an embodiment in which a presentation component provides telemetry data formatting, and in which a connection manager creates and stores lists of server instance cluster members.

FIG. 7 illustrates a computing environment in which a computer system 702 provides a presentation component 703 that is configured to export and present network telemetry messages in a format that is understandable by the various server instances. For instance, in some cases, the computer system 702 instantiates or otherwise implements presentation component 703 to format and export telemetry messages in a format that is understandable by the server instances 709. The presentation component 703 includes a data formatting module 704 that interprets the telemetry data 701 in gNMI or other telemetry messages and reformats that data into a format that the server instances 709 can use. Once the data has been reformatted, the exporting module 705 of the presentation component 703 exports the reformatted telemetry data to one or more of the server instances 709 in a given cluster.

The data formatting module 704 is configured to reformat the telemetry data 701 into a variety of different data formats, including formats that are human-readable. In other cases, the data formatting module 704 reformats the telemetry data for compatibility with a specified network analysis tool that operates in a given format. Additionally or alternatively, at least in some cases, the exporting module 705 is configured to provide the reformatted telemetry data to any number of network server instances, whether those instances are within the same internal network, or are part of an external network (e.g., as shown in FIG. 6). Still further, at least in some cases, the presentation component 703 is configured to present telemetry data 701 included in original or replicated network telemetry messages in a data visualization tool. In some embodiments, the data visualization tool is configured to present the telemetry data in a manner that can be parsed by a human user. The data visualization tool allows users to sort, rearrange, or otherwise manipulate the telemetry data to reveal certain operational characteristics of the target networking device, for example, or to identify which conditions trigger a specified failure. Regardless of how the visualization tool is used, the presentation component 703 formats and exports the telemetry data in a customizable manner that is different for each user or for each situation.

The computer system 702 of FIG. 7 also includes a connection manager 706. The connection manager is configured to maintain a list of cluster members in the cluster of networked server instances. The connection manager 706 maintains the list of cluster members 707 (e.g., server instances 709) using a common interface. This common interface thus facilitates intercommunication between server instances and/or target networking devices. In some cases, the server instances add themselves to a listing of server instances (e.g., 707) in the cluster of networked server instances using a common address. This common address allows each server instance to register at the same address and add themselves to the listing of server instances. In some examples, server instances use the listing to determine where network telemetry data is stored.

Thus, for instance, as in FIG. 5, if server instance 509 already has a copy of the gNMI data 507, a client that is physically located near server instance 510 and wants to access the gNMI data 507 can simply go to server instance 509 instead of taking a potentially longer hop to server instance 505. Similarly, server instances added to the listing of cluster members 707 are permitted to request a list of other members of the cluster of networked server instances and an indication of where the replicated network telemetry messages are stored (e.g., at storage location 708) on each cluster member. Using this information, the requesting server instances can then access the stored telemetry data at the specified data storage location 708. In some embodiments, once a given server instance has learned where the replicated network telemetry messages are stored on the other cluster member(s), that server instance may indicate to other server instances or to underlying server instance components where to fetch the replicated network telemetry data 701. As such, the underlying server instance components then access the replicated network telemetry messages at the indicated data storage location 708.

In some embodiments, a corresponding system is provided. The system includes at least one physical processor and physical memory comprising computer-executable instructions that, when executed by the physical processor, cause the physical processor to: identify a target networking device communicatively connected to a cluster of networked server instances, the networked server instances being configured to consume network telemetry messages, apply a shared lock to the target networking device, such that only a single networked server instance has access to network telemetry messages produced by the target networking device, replicate the network telemetry messages produced by the locked target networking device to other server instances in the cluster of networked server instances, and divert requests for network telemetry messages from the locked target networking device to another server instance in the cluster of networked server instances, allowing the other server instance in the cluster to service the diverted telemetry data requests for the locked target networking device using the replicated network telemetry messages.

Similarly, a non-transitory computer-readable medium may be provided which includes computer-executable instructions that, when executed by at least one processor of a computing device, cause the computing device to: identify a target networking device communicatively connected to a cluster of networked server instances, the networked server instances being configured to consume network telemetry messages, apply a shared lock to the target networking device, such that only a single networked server instance has access to network telemetry messages produced by the target networking device, replicate the network telemetry messages produced by the locked target networking device to other server instances in the cluster of networked server instances, and divert requests for network telemetry messages from the locked target networking device to another server instance in the cluster of networked server instances, allowing the other server instance in the cluster to service the diverted telemetry data requests for the locked target networking device using the replicated network telemetry messages.

Accordingly, in this manner, the embodiments described herein apply locks to target networking devices and replicate their telemetry data to other server instance nodes in a cluster to ensure that the target networking devices are not overburdened with telemetry data requests. Moreover, the embodiments described herein propagate the telemetry data over multiple nodes to provide redundancy, load-balancing, and scalability to networks that need and use telemetry data from their network devices, but do not wish to overwhelm their network device with telemetry data requests from the many thousands or millions of server instances that may be instantiated in any given cluster.

Figure 8:
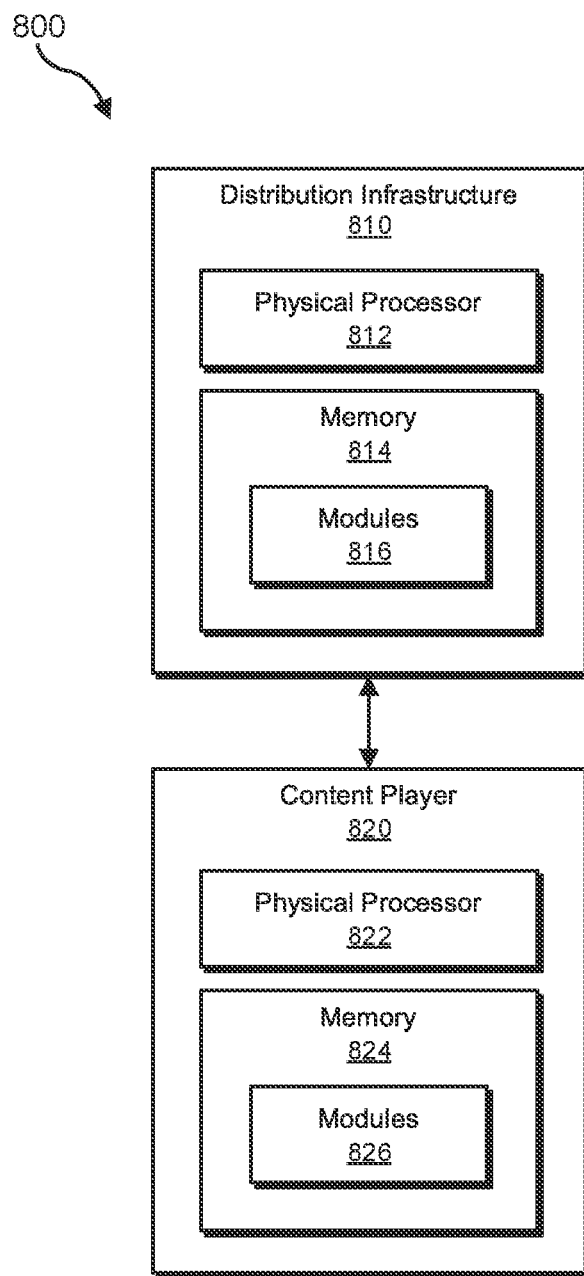
FIG. 8 is a block diagram of an exemplary content distribution ecosystem.
Figure 10:
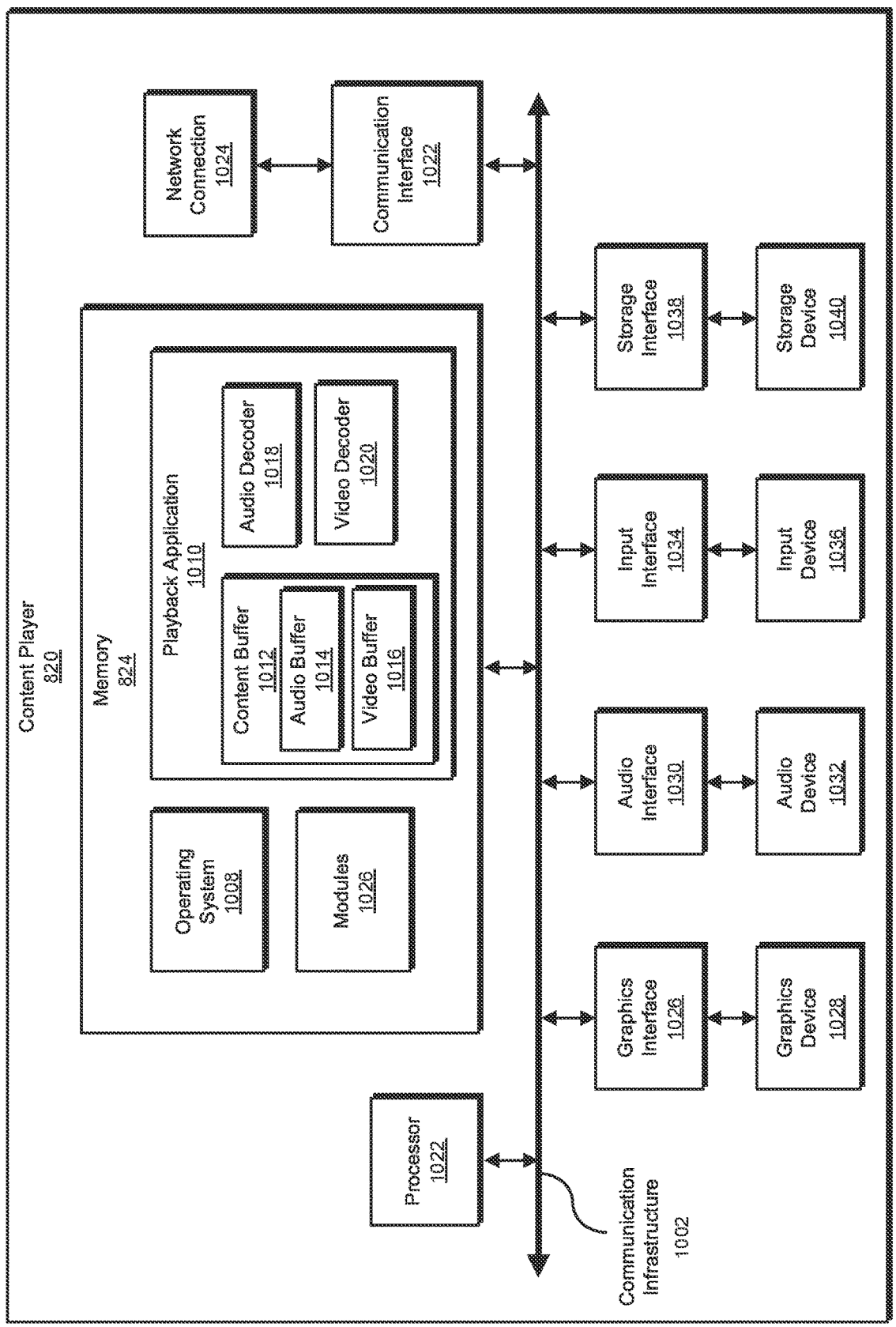
FIG. 10 is a block diagram of an exemplary content player within the content distribution ecosystem shown in FIG. 8.

The following will provide, with reference to FIG. 8, detailed descriptions of exemplary ecosystems in which content is provisioned to end nodes and in which requests for content are steered to specific end nodes. The discussion corresponding to FIGS. 10 and 11 presents an overview of an exemplary distribution infrastructure and an exemplary content player used during playback sessions, respectively. These exemplary ecosystems and distribution infrastructures are implemented in any of the embodiments described above with reference to FIGS. 1-7.

FIG. 8 is a block diagram of a content distribution ecosystem 800 that includes a distribution infrastructure 810 in communication with a content player 820. In some embodiments, distribution infrastructure 810 is configured to encode data at a specific data rate and to transfer the encoded data to content player 820. Content player 820 is configured to receive the encoded data via distribution infrastructure 810 and to decode the data for playback to a user. The data provided by distribution infrastructure 810 includes, for example, audio, video, text, images, animations, interactive content, haptic data, virtual or augmented reality data, location data, gaming data, or any other type of data that is provided via streaming.

Distribution infrastructure 810 generally represents any services, hardware, software, or other infrastructure components configured to deliver content to end users. For example, distribution infrastructure 810 includes content aggregation systems, media transcoding and packaging services, network components, and/or a variety of other types of hardware and software. In some cases, distribution infrastructure 810 is implemented as a highly complex distribution system, a single media server or device, or anything in between. In some examples, regardless of size or complexity, distribution infrastructure 810 includes at least one physical processor 812 and at least one memory device 814. One or more modules 816 are stored or loaded into memory 814 to enable adaptive streaming, as discussed herein.

Content player 820 generally represents any type or form of device or system capable of playing audio and/or video content that has been provided over distribution infrastructure 810. Examples of content player 820 include, without limitation, mobile phones, tablets, laptop computers, desktop computers, televisions, set-top boxes, digital media players, virtual reality headsets, augmented reality glasses, and/or any other type or form of device capable of rendering digital content. As with distribution infrastructure 810, content player 820 includes a physical processor 822, memory 824, and one or more modules 826. Some or all of the adaptive streaming processes described herein is performed or enabled by modules 826, and in some examples, modules 816 of distribution infrastructure 810 coordinate with modules 826 of content player 820 to provide adaptive streaming of multimedia content.

In certain embodiments, one or more of modules 816 and/or 826 in FIG. 8 represent one or more software applications or programs that, when executed by a computing device, cause the computing device to perform one or more tasks. For example, and as will be described in greater detail below, one or more of modules 816 and 826 represent modules stored and configured to run on one or more general-purpose computing devices. One or more of modules 816 and 826 in FIG. 8 also represent all or portions of one or more special-purpose computers configured to perform one or more tasks.

In addition, one or more of the modules, processes, algorithms, or steps described herein transform data, physical devices, and/or representations of physical devices from one form to another. For example, one or more of the modules recited herein receive audio data to be encoded, transform the audio data by encoding it, output a result of the encoding for use in an adaptive audio bit-rate system, transmit the result of the transformation to a content player, and render the transformed data to an end user for consumption. Additionally or alternatively, one or more of the modules recited herein transform a processor, volatile memory, non-volatile memory, and/or any other portion of a physical computing device from one form to another by executing on the computing device, storing data on the computing device, and/or otherwise interacting with the computing device.

Physical processors 812 and 822 generally represent any type or form of hardware-implemented processing unit capable of interpreting and/or executing computer-readable instructions. In one example, physical processors 812 and 822 access and/or modify one or more of modules 816 and 826, respectively. Additionally or alternatively, physical processors 812 and 822 execute one or more of modules 816 and 826 to facilitate adaptive streaming of multimedia content. Examples of physical processors 812 and 822 include, without limitation, microprocessors, microcontrollers, central processing units (CPUs), field-programmable gate arrays (FPGAs) that implement softcore processors, application-specific integrated circuits (ASICs), portions of one or more of the same, variations or combinations of one or more of the same, and/or any other suitable physical processor.

Memory 814 and 824 generally represent any type or form of volatile or non-volatile storage device or medium capable of storing data and/or computer-readable instructions. In one example, memory 814 and/or 824 stores, loads, and/or maintains one or more of modules 816 and 826. Examples of memory 814 and/or 824 include, without limitation, random access memory (RAM), read only memory (ROM), flash memory, hard disk drives (HDDs), solid-state drives (SSDs), optical disk drives, caches, variations or combinations of one or more of the same, and/or any other suitable memory device or system.

Figure 9:
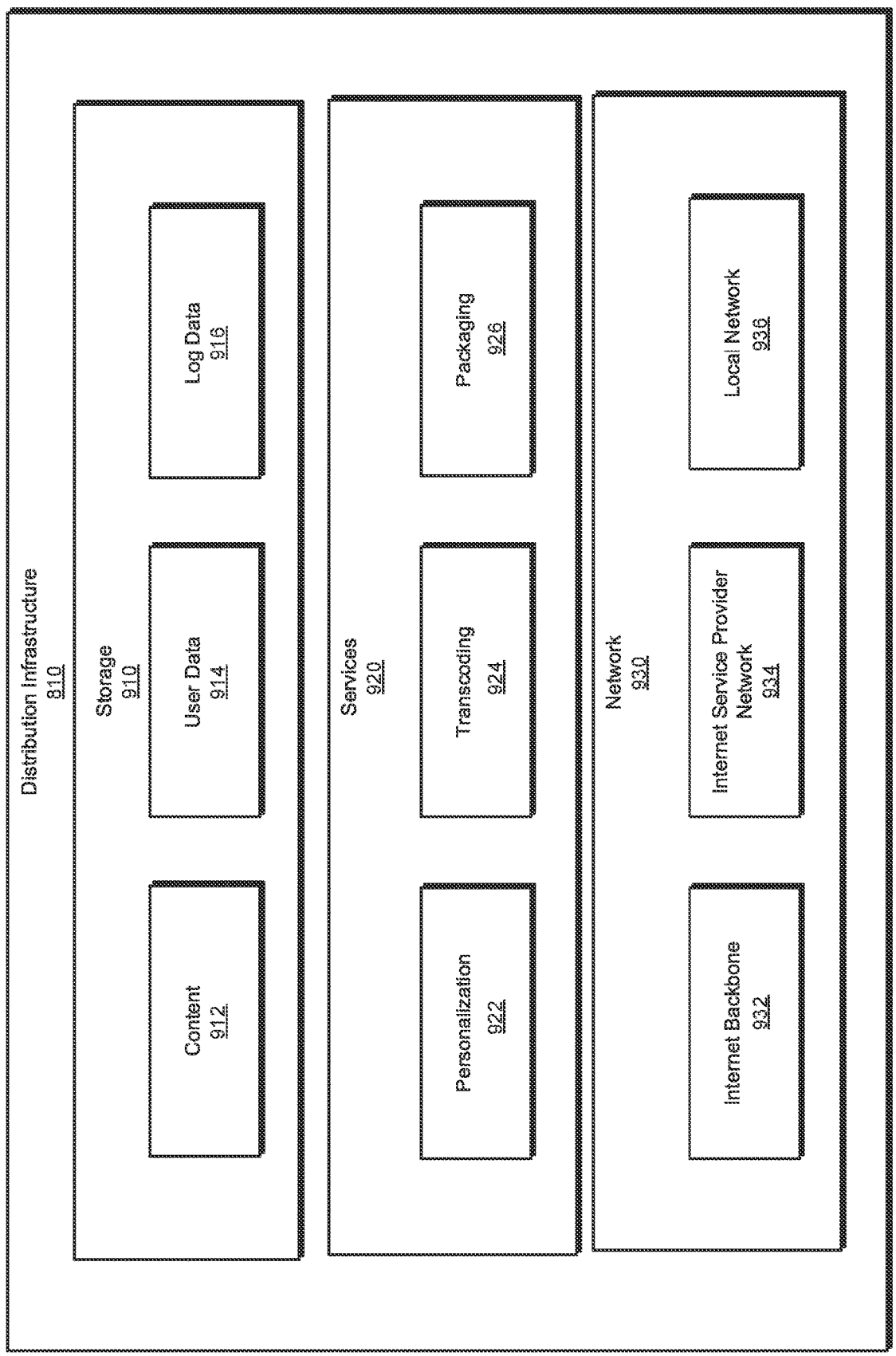
FIG. 9 is a block diagram of an exemplary distribution infrastructure within the content distribution ecosystem shown in FIG. 8.

FIG. 9 is a block diagram of exemplary components of content distribution infrastructure 810 according to certain embodiments. Distribution infrastructure 810 includes storage 910, services 920, and a network 930. Storage 910 generally represents any device, set of devices, and/or systems capable of storing content for delivery to end users. Storage 910 includes a central repository with devices capable of storing terabytes or petabytes of data and/or includes distributed storage systems (e.g., appliances that mirror or cache content at Internet interconnect locations to provide faster access to the mirrored content within certain regions). Storage 910 is also configured in any other suitable manner.

As shown, storage 910 may store a variety of different items including content 912, user data 914, and/or log data 916. Content 912 includes television shows, movies, video games, user-generated content, and/or any other suitable type or form of content. User data 914 includes personally identifiable information (PII), payment information, preference settings, language and accessibility settings, and/or any other information associated with a particular user or content player. Log data 916 includes viewing history information, network throughput information, and/or any other metrics associated with a user's connection to or interactions with distribution infrastructure 810.

Services 920 includes personalization services 922, transcoding services 924, and/or packaging services 926. Personalization services 922 personalize recommendations, content streams, and/or other aspects of a user's experience with distribution infrastructure 810. Encoding services 924 compress media at different bitrates which, as described in greater detail below, enable real-time switching between different encodings. Packaging services 926 package encoded video before deploying it to a delivery network, such as network 930, for streaming.

Network 930 generally represents any medium or architecture capable of facilitating communication or data transfer. Network 930 facilitates communication or data transfer using wireless and/or wired connections. Examples of network 930 include, without limitation, an intranet, a wide area network (WAN), a local area network (LAN), a personal area network (PAN), the Internet, power line communications (PLC), a cellular network (e.g., a global system for mobile communications (GSM) network), portions of one or more of the same, variations or combinations of one or more of the same, and/or any other suitable network. For example, as shown in FIG. 9, network 930 includes an Internet backbone 932, an internet service provider 934, and/or a local network 936. As discussed in greater detail below, bandwidth limitations and bottlenecks within one or more of these network segments triggers video and/or audio bit rate adjustments.

FIG. 10 is a block diagram of an exemplary implementation of content player 820 of FIG. 8. Content player 820 generally represents any type or form of computing device capable of reading computer-executable instructions. Content player 820 includes, without limitation, laptops, tablets, desktops, servers, cellular phones, multimedia players, embedded systems, wearable devices (e.g., smart watches, smart glasses, etc.), smart vehicles, gaming consoles, internet-of-things (IoT) devices such as smart appliances, variations or combinations of one or more of the same, and/or any other suitable computing device.

As shown in FIG. 10, in addition to processor 822 and memory 824, content player 820 includes a communication infrastructure 1002 and a communication interface 1022 coupled to a network connection 1024. Content player 820 also includes a graphics interface 1026 coupled to a graphics device 1028, an input interface 1034 coupled to an input device 1036, and a storage interface 1038 coupled to a storage device 1040.

Communication infrastructure 1002 generally represents any type or form of infrastructure capable of facilitating communication between one or more components of a computing device. Examples of communication infrastructure 1002 include, without limitation, any type or form of communication bus (e.g., a peripheral component interconnect (PCI) bus, PCI Express (PCIe) bus, a memory bus, a frontside bus, an integrated drive electronics (IDE) bus, a control or register bus, a host bus, etc.).

As noted, memory 824 generally represents any type or form of volatile or non-volatile storage device or medium capable of storing data and/or other computer-readable instructions. In some examples, memory 824 stores and/or loads an operating system 1008 for execution by processor

822. In one example, operating system 1008 includes and/or represents software that manages computer hardware and software resources and/or provides common services to computer programs and/or applications on content player 820.

Operating system 1008 performs various system management functions, such as managing hardware components (e.g., graphics interface 1026, audio interface 1030, input interface 1034, and/or storage interface 1038). Operating system 1008 also provides process and memory management models for playback application 1010. The modules of playback application 1010 includes, for example, a content buffer 1012, an audio decoder 1018, and a video decoder 1020.

Playback application 1010 is configured to retrieve digital content via communication interface 1022 and play the digital content through graphics interface 1026. Graphics interface 1026 is configured to transmit a rendered video signal to graphics device 1028. In normal operation, playback application 1010 receives a request from a user to play a specific title or specific content. Playback application 1010 then identifies one or more encoded video and audio streams associated with the requested title. After playback application 1010 has located the encoded streams associated with the requested title, playback application 1010 downloads sequence header indices associated with each encoded stream associated with the requested title from distribution infrastructure 810. A sequence header index associated with encoded content includes information related to the encoded sequence of data included in the encoded content.

In one embodiment, playback application 1010 begins downloading the content associated with the requested title by downloading sequence data encoded to the lowest audio and/or video playback bitrates to minimize startup time for playback. The requested digital content file is then downloaded into content buffer 1012, which is configured to serve as a first-in, first-out queue. In one embodiment, each unit of downloaded data includes a unit of video data or a unit of audio data. As units of video data associated with the requested digital content file are downloaded to the content player 820, the units of video data are pushed into the content buffer 1012. Similarly, as units of audio data associated with the requested digital content file are downloaded to the content player 820, the units of audio data are pushed into the content buffer 1012. In one embodiment, the units of video data are stored in video buffer 1016 within content buffer 1012 and the units of audio data are stored in audio buffer 1014 of content buffer 1012.

A video decoder 1020 reads units of video data from video buffer 1016 and outputs the units of video data in a sequence of video frames corresponding in duration to the fixed span of playback time. Reading a unit of video data from video buffer 1016 effectively de-queues the unit of video data from video buffer 1016. The sequence of video frames is then rendered by graphics interface 1026 and transmitted to graphics device 1028 to be displayed to a user.

An audio decoder 1018 reads units of audio data from audio buffer 1014 and output the units of audio data as a sequence of audio samples, generally synchronized in time with a sequence of decoded video frames. In one embodiment, the sequence of audio samples is transmitted to audio interface 1030, which converts the sequence of audio samples into an electrical audio signal. The electrical audio signal is then transmitted to a speaker of audio device 1032, which, in response, generates an acoustic output.

In situations where the bandwidth of distribution infrastructure 810 is limited and/or variable, playback application 1010 downloads and buffers consecutive portions of video data and/or audio data from video encodings with different bit rates based on a variety of factors (e.g., scene complexity, audio complexity, network bandwidth, device capabilities, etc.). In some embodiments, video playback quality is prioritized over audio playback quality. Audio playback and video playback quality are also balanced with each other, and in some embodiments audio playback quality is prioritized over video playback quality.

Graphics interface 1026 is configured to generate frames of video data and transmit the frames of video data to graphics device 1028. In one embodiment, graphics interface 1026 is included as part of an integrated circuit, along with processor 822. Alternatively, graphics interface 1026 is configured as a hardware accelerator that is distinct from (i.e., is not integrated within) a chipset that includes processor 822.

Graphics interface 1026 generally represents any type or form of device configured to forward images for display on graphics device 1028. For example, graphics device 1028 is fabricated using liquid crystal display (LCD) technology, cathode-ray technology, and light-emitting diode (LED) display technology (either organic or inorganic). In some embodiments, graphics device 1028 also includes a virtual reality display and/or an augmented reality display. Graphics device 1028 includes any technically feasible means for generating an image for display. In other words, graphics device 1028 generally represents any type or form of device capable of visually displaying information forwarded by graphics interface 1026.

As illustrated in FIG. 10, content player 820 also includes at least one input device 1036 coupled to communication infrastructure 1002 via input interface 1034. Input device 1036 generally represents any type or form of computing device capable of providing input, either computer or human generated, to content player 820. Examples of input device 1036 include, without limitation, a keyboard, a pointing device, a speech recognition device, a touch screen, a wearable device (e.g., a glove, a watch, etc.), a controller, variations or combinations of one or more of the same, and/or any other type or form of electronic input mechanism.

Content player 820 also includes a storage device 1040 coupled to communication infrastructure 1002 via a storage interface 1038. Storage device 1040 generally represents any type or form of storage device or medium capable of storing data and/or other computer-readable instructions. For example, storage device 1040 is a magnetic disk drive, a solid-state drive, an optical disk drive, a flash drive, or the like. Storage interface 1038 generally represents any type or form of interface or device for transferring data between storage device 1040 and other components of content player 820.

Many other devices or subsystems are included in or connected to content player 820. Conversely, one or more of the components and devices illustrated in FIG. 10 need not be present to practice the embodiments described and/or illustrated herein. The devices and subsystems referenced above are also interconnected in different ways from that shown in FIG. 10. Content player 820 is also employed in any number of software, firmware, and/or hardware configurations. For example, one or more of the example embodiments disclosed herein are encoded as a computer program (also referred to as computer software, software applications, computer-readable instructions, or computer control logic) on a computer-readable medium. The term "computer-readable medium," as used herein, refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, etc.), optical-storage media (e.g., Compact Disks (CDs), Digital Video Disks (DVDs), and BLU-RAY disks), electronic-storage media (e.g., solid-state drives and flash media), and other digital storage systems.

A computer-readable medium containing a computer program is loaded into content player 820. All or a portion of the computer program stored on the computer-readable medium is then stored in memory 824 and/or storage device 1040. When executed by processor 822, a computer program loaded into memory 824 causes processor 822 to perform and/or be a means for performing the functions of one or more of the example embodiments described and/or illustrated herein. Additionally or alternatively, one or more of the example embodiments described and/or illustrated herein are implemented in firmware and/or hardware. For example, content player 820 is configured as an Application Specific Integrated Circuit (ASIC) adapted to implement one or more of the example embodiments disclosed herein Example Embodiments 1. A computer-implemented method comprising: identifying a target networking device communicatively connected to a cluster of networked server instances, the networked server instances being configured to consume network telemetry messages, applying a shared lock to the target networking device, such that only a single networked server instance has access to network telemetry messages produced by the target networking device, replicating the network telemetry messages produced by the locked target networking device to one or more other server instances in the cluster of networked server instances, and diverting one or more requests for network telemetry messages from the locked target networking device to at least one other server instance in the cluster of networked server instances, allowing the at least one other server instance in the cluster to service the diverted telemetry data requests for the locked target networking device using the replicated network telemetry messages.

2. The computer-implemented method of claim 1, wherein the network telemetry messages comprise gRPC (Remote Procedure Call) Network Management Interface (gNMI) messages.

3. The computer-implemented method of claim 2, wherein the gNMI messages are stored by the at least one other server instance for a specified amount of time.

4. The computer-implemented method of claim 3, wherein the gNMI messages are stored in a data cache, such that at least one other server instance services the diverted telemetry data requests using the cached gNMI messages.

5. The computer-implemented method of claim 1, wherein the network telemetry messages are replicated to a plurality of server instances, and wherein the requests for network telemetry messages from the locked target networking device are diverted to multiple server instances within the plurality of server instances.

6. The computer-implemented method of claim 1, wherein one or more of the network telemetry messages are replicated to at least one external server instance outside of the cluster of networked server instances.

7. The computer-implemented method of claim 6, wherein one or more requests for network telemetry messages from the locked target networking device are diverted to the at least one external server instance outside of the cluster of networked server instances.

8. The computer-implemented method of claim 1, wherein the network telemetry messages produced by the locked target networking device are replicated to a plurality of other server instances that are configured to load-balance incoming requests for network telemetry messages among the plurality of other server instances.

9. The computer-implemented method of claim 1, further comprising automatically loading the target networking device according to a metadata tag included in an associated target loader configuration file that is associated with the target networking device.

10. The computer-implemented method of claim 1, further comprising providing a presentation component that is configured to export and present the network telemetry messages in a format that is understandable by the at least one server instance.

11. The computer-implemented method of claim 1, wherein the target networking device to which a shared lock has been applied comprises at least one of a router, a gateway, a hub, or a firewall.

12. A system comprising: at least one physical processor and physical memory comprising computer-executable instructions that, when executed by the physical processor, cause the physical processor to: identify a target networking device communicatively connected to a cluster of networked server instances, the networked server instances being configured to consume network telemetry messages, apply a shared lock to the target networking device, such that only a single networked server instance has access to network telemetry messages produced by the target networking device, replicate the network telemetry messages produced by the locked target networking device to one or more other server instances in the cluster of networked server instances; and divert one or more requests for network telemetry messages from the locked target networking device to at least one other server instance in the cluster of networked server instances, allowing the at least one other server instance in the cluster to service the diverted telemetry data requests for the locked target networking device using the replicated network telemetry messages.

13. The system of claim 12, further comprising instantiating a connection manager to maintain a list of cluster members in the cluster of networked server instances using a common interface.

14. The system of claim 13, wherein one or more of the server instances add themselves to a listing of server instances in the cluster of networked server instances using a common address.

15. The system of claim 14, wherein at least one of the server instances added to the listing of server instances requests a list of other members of the cluster of networked server instances and an indication of where the replicated network telemetry messages are stored on each cluster member.

16. The system of claim 15, further comprising, upon learning where the replicated network telemetry messages are stored on at least one other cluster member, indicating to one or more underlying server instance components where to fetch the replicated network telemetry data, such that the underlying server instance components access the replicated network telemetry messages at the indicated location.

17. The system of claim 12, further comprising: determining that a new target networking device has come online within the cluster of networked server instances, and automatically applying a shared lock to the new target networking device.

18. The system of claim 12, further comprising reformatting one or more portions of data included in the replicated network telemetry messages for compatibility with at least one specified network analysis tool.

19. The system of claim 12, further comprising presenting one or more portions of data included in the replicated network telemetry messages in a data visualization tool.

20. A non-transitory computer-readable medium comprising one or more computer-executable instructions that, when executed by at least one processor of a computing device, cause the computing device to: identify a target networking device communicatively connected to a cluster of networked server instances, the networked server instances being configured to consume network telemetry messages, apply a shared lock to the target networking device, such that only a single networked server instance has access to network telemetry messages produced by the target networking device, replicate the network telemetry messages produced by the locked target networking device to one or more other server instances in the cluster of networked server instances, and divert one or more requests for network telemetry messages from the locked target networking device to at least one other server instance in the cluster of networked server instances, allowing the at least one other server instance in the cluster to service the diverted telemetry data requests for the locked target networking device using the replicated network telemetry messages.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to apply shared locks, use the result of the transformation to replicate network telemetry messages, and store the result of the transformation to divert request for network telemetry messages to other server instances within a cluster. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   determining that a target networking device is communicatively connected to a cluster of networked server instances and to an external network;
   applying a shared lock to the target networking device, wherein only a single external server instance of the external network is permitted to send requests to and receive network telemetry messages produced by the target networking device;
   replicating the network telemetry messages produced by the locked target networking device to the external server instance that is outside of the cluster of the networked server instances; and
   diverting one or more requests for the network telemetry messages produced by the locked target networking device to the external server instance of the external network, wherein the external server instance services the diverted requests for network telemetry messages produced by the locked target networking device using the replicated network telemetry messages.

2. The computer-implemented method of claim 1, wherein the network telemetry messages produced by the locked target networking device comprise gRPC (Remote Procedure Call) Network Management Interface (gNMI) messages.

3. The computer-implemented method of claim 2, wherein the gNMI messages are stored by the external server instance for a specified amount of time.

4. The computer-implemented method of claim 3, wherein the gNMI messages are stored in a data cache, and wherein at least one other external server instance services the diverted one or more requests using the stored gNMI messages.

5. The computer-implemented method of claim 1, wherein the network telemetry messages produced by the locked target networking device are replicated to a plurality of external server instances, and wherein one or more requests for the network telemetry messages produced by the locked target networking device are diverted to multiple external server instances within the plurality of external server instances.

6. The computer-implemented method of claim 1, wherein the network telemetry messages produced by the locked target networking device are replicated to a plurality of other external server instances that are configured to load-balance incoming requests for network telemetry messages among the plurality of other external server instances.

7. The computer-implemented method of claim 1, further comprising automatically loading the target networking device according to a metadata tag included in an associated target loader configuration file that is associated with the target networking device.

8. The computer-implemented method of claim 1, further comprising exporting and presenting the network telemetry messages produced by the locked target networking device in a format that is understandable by the external server instance.

9. The computer-implemented method of claim 1, further comprising presenting one or more portions of data included in the replicated network telemetry messages in a data visualization tool.

10. A system comprising:
    a physical processor; and
    physical memory comprising computer-executable instructions that, when executed by the physical processor, cause the physical processor to:
    determine that a target networking device is communicatively connected to a cluster of networked server instances and to an external network;
    apply a shared lock to the target networking device, wherein only a single external server instance of the external network is permitted to send requests to and receive network telemetry messages produced by the target networking device;
    replicate the network telemetry messages produced by the locked target networking device to the external server instance that is outside of the cluster of the networked server instances; and
    divert one or more requests for the network telemetry messages produced by the locked target networking device to the external server instance of the external network, wherein the external server instance services the diverted requests for network telemetry messages produced by the locked target networking device using the replicated network telemetry messages.

11. The system of claim 10, further comprising instantiating a connection manager to maintain a list of cluster members in the cluster of networked server instances using a common interface.

12. The system of claim 10, wherein one or more of the networked server instances add the one or more networked server instances to a listing of server instances in the cluster of networked server instances using a common address.

13. The system of claim 10, further comprising:
    determining that a new target networking device has come online within the cluster of networked server instances; and
    automatically applying a shared lock to the new target networking device.

14. The system of claim 10, further comprising reformatting one or more portions of data included in the replicated network telemetry messages for compatibility with at least one specified network analysis tool.

15. The system of claim 10, wherein the target networking device to which the shared lock has been applied comprises at least one of a router, a gateway, a hub, or a firewall.

16. A non-transitory computer-readable medium comprising one or more computer-executable instructions that, when executed by at least one processor of a computing device, cause the computing device to:
    determine that a target networking device is communicatively connected to a cluster of networked server instances and to an external network;
    apply a shared lock to the target networking device, wherein only a single external server instance of the external network is permitted to send requests to and receive network telemetry messages produced by the target networking device;
    replicate the network telemetry messages produced by the locked target networking device to the external server instance that is outside of the cluster of the networked server instances; and
    divert one or more requests for the network telemetry messages produced by the locked target networking device to the external server instance of the external network, wherein the external server instance services the diverted requests for network telemetry messages produced by the locked target networking device using the replicated network telemetry messages.

17. The non-transitory computer-readable medium of claim 16, wherein the network telemetry messages produced by the locked target networking device are replicated to a plurality of external server instances, and wherein one or more requests for the network telemetry messages produced by the locked target networking device are diverted to multiple external server instances within the plurality of external server instances.

18. The non-transitory computer-readable medium of claim 16, wherein the network telemetry messages produced by the locked target networking device are replicated to a plurality of other external server instances that are configured to load-balance incoming requests for network telemetry messages among the plurality of other external server instances.

19. The non-transitory computer-readable medium of claim 16, wherein the computing device automatically loads the target networking device according to a metadata tag included in an associated target loader configuration file that is associated with the target networking device.

20. The non-transitory computer-readable medium of claim 16, wherein the computing device further exports and presents the network telemetry messages produced by the locked target networking device in a format that is understandable by the external server instance.

\* \* \* \* \*